(12) United States Patent
Wang et al.

(10) Patent No.: US 7,327,713 B2
(45) Date of Patent: Feb. 5, 2008

(54) MULTI-USER DETECTION IN CDMA COMMUNICATIONS SYSTEM

(76) Inventors: Rui R. Wang, deceased, late of Ottawa (CA); by Chao Wang, legal representative, 1204-900 Dynes Road, Ottawa, Ontario (CA) K2C 3L6; Wen Tong, #903-1000 Castle Hill Crest., Ottawa, Ontario (CA) K2C 3L7; Philip Thomas, 13 rue Marlow, 78160 Marly le roi (FR); Yuri S. Shinakov, Vilnusskaja ui. d. 7, kor.2, kv. 125, Moskow, 117574 (RU); Alexandere M. Chloma, g. Zhukovski, ul. Gagarina, dom 63, kv. 27, Moskovskaja Oblast, 140160 (RU); Mikhail G. Bakouline, g. Podolsk, ul. Kirova, d.35, kv.31, Moskovskaha Oblast, 142110 (RU); Vitali B. Kreindeline, ul. Grajvoronovskaja, d.8, kor. 1, kv.87, Moskow, 109518 (RU)

( * ) Notice: Subject to any disclaimer, the term of this patent is extended or adjusted under 35 U.S.C. 154(b) by 1118 days.

(21) Appl. No.: 09/950,776

(22) Filed: Sep. 13, 2001

(65) Prior Publication Data

US 2002/0054623 A1    May 9, 2002

(30) Foreign Application Priority Data

Sep. 13, 2000    (RU) .................. PCT/RU00/00364

(51) Int. Cl.
     *H04B 7/216*    (2006.01)
(52) U.S. Cl. .................. 370/342; 370/335; 370/441; 370/479; 375/140; 375/142; 375/147; 375/150
(58) Field of Classification Search ............ 370/335, 370/342, 441, 479; 375/140, 150, 142, 147
See application file for complete search history.

(56) References Cited

U.S. PATENT DOCUMENTS

| 3,720,789 | A | * | 3/1973 | Clark ..................... 370/203 |
| 4,470,138 | A |   | 9/1984 | Gutleber |
| 5,218,619 | A |   | 6/1993 | Dent |
| 5,442,661 | A |   | 8/1995 | Falconer ................. 375/205 |
| 5,553,062 | A | * | 9/1996 | Schilling et al. .......... 370/479 |
| 5,568,473 | A | * | 10/1996 | Hemmati ................ 370/342 |
| 5,644,592 | A | * | 7/1997 | Divsalar et al. ......... 375/147 |
| 5,691,974 | A | * | 11/1997 | Zehavi et al. ........... 370/203 |

(Continued)

FOREIGN PATENT DOCUMENTS

WO    WO 96/06487    2/1996

*Primary Examiner*—Edan Orgad
*Assistant Examiner*—Andrew C. Lee

(57) ABSTRACT

For each user in a multi-user detection arrangement in a CDMA communications system, a detector (80) provides a limiting function (88) responsive to a combined signal to produce a detection signal, having any of at least three possible values, for supply to a signal regenerator, regenerated signals being subtracted from a received signal in successive detection iterations of the multi-user detection arrangement. A code correlated signal is supplied via an inverse hyperbolic tangent function (84), or is multiplied by a multiplier inverse to an iteration index, to produce a derived signal. The derived signal is added (86) to a representation of a detection result stored from a previous iteration to produce the combined signal. The limiting function can comprise a hyperbolic tangent function.

16 Claims, 6 Drawing Sheets

U.S. PATENT DOCUMENTS

| | | | |
|---|---|---|---|
| 5,764,687 A * | 6/1998 | Easton | 375/147 |
| 5,799,035 A * | 8/1998 | Lattard et al. | 375/152 |
| 6,014,373 A * | 1/2000 | Schilling et al. | 370/342 |
| 6,088,383 A * | 7/2000 | Suzuki et al. | 375/148 |
| 6,278,725 B1 * | 8/2001 | Rouphael et al. | 375/148 |
| 6,377,611 B1 * | 4/2002 | Hwang | 375/140 |
| 6,381,233 B1 * | 4/2002 | Sunaga | 370/335 |
| 6,434,135 B1 * | 8/2002 | Ozluturk et al. | 370/342 |
| 6,473,415 B1 * | 10/2002 | Kim et al. | 370/342 |
| 6,603,819 B1 * | 8/2003 | Myers | 375/316 |
| 6,647,022 B1 * | 11/2003 | Mailaender | 370/441 |
| 6,661,835 B1 * | 12/2003 | Sugimoto et al. | 375/148 |
| 6,684,061 B1 * | 1/2004 | Yost | 455/423 |
| 6,741,634 B1 * | 5/2004 | Kim et al. | 375/144 |
| 6,751,268 B1 * | 6/2004 | Myers | 375/296 |
| 6,757,334 B1 * | 6/2004 | Feher | 375/259 |
| 6,968,023 B2 * | 11/2005 | Aoyama et al. | 375/346 |
| 2002/0159507 A1 * | 10/2002 | Flaig et al. | 375/148 |

* cited by examiner

MULTI-USER DETECTION IN CDMA COMMUNICATIONS SYSTEM

This invention relates to CDMA (Code Division Multiple Access) communications systems, and is particularly concerned with multi-user detection in such systems.

BACKGROUND OF THE INVENTION

In order to increase the capacity, or number of simultaneous users, of a direct-sequence CDMA (DS-CDMA) system it is desirable to enhance the detection of the signal of each user and to distinguish each signal more distinctly from noise or interference. Typically in known CDMA systems a single user detection scheme has been used in which the signal of an individual user is detected using a matched filter detector, and signals of all other users are treated by the single user detector as interference or noise. It has been proposed to enhance signal detection in a base station of a CDMA system by using a multi-user detection technique, which seeks to detect jointly the signals of multiple users.

In a known form of multi-user detection, conventional matched filtering is first used to detect a signal bit of each user, this constituting a tentative decision bit for the user. The tentative decision bits are used to regenerate the transmitted signal, including its multipath fading, for all of the multiple users. For each specific user, replica or regenerated signals for all of the other users are subtracted from a received signal mixture, thereby enhancing the specific user's signal and reducing or cancelling interference due to the other users' signals, facilitating detection of the enhanced signal for each user. Ideally, this regeneration can be repeated iteratively with successively more accurate cancellation of the respective other users' signals to achieve a correct detection of the signals of all of the users.

Inherent in this successive cancellation technique is a fundamental assumption that the initially determined tentative decision bits are error-free. Especially for large numbers of users as is a reason for providing multi-user detection, this assumption has been found not to be valid, and these first iteration tentative decision bits are not in general reliable. Consequently, the replica or regenerated signals are not reliably accurate, the subtraction of these from the received signal mixture can be wrong, and interference can be increased rather than reduced. Such error propagation has limited known multi-user detection schemes to only about 2 successive cancellation iterations, resulting in little or no gain in system capacity from the multi-user detection scheme.

A need exists, therefore, to provide improved multi-user detection in CDMA communications systems.

SUMMARY OF THE INVENTION

According to one aspect, this invention provides an iterative arrangement for receiving and detecting signals of a plurality of users in a CDMA communications system, comprising, for signals of each user: a signal combiner for subtracting regenerated signals of other users from a received signal to produce a modified received signal for the user; a receiver arrangement responsive to the modified received signal for producing a correlated signal for the user; a detector responsive to the correlated signal for producing a detected signal; and a signal regenerator responsive to the detected signal for producing a regenerated signal for the user for subtraction from the received signal in the signal combiners of other users; wherein the detector comprises a store, a limiting function, and a further signal combiner, the limiting function being responsive to an output of the further signal combiner to produce a limited signal having any of at least three possible values as the detected signal for the signal regenerator, the store being responsive to the output of the further signal combiner to store a representation of the detected signal in a current iteration, and the further signal combiner being arranged to combine a representation of the detected signal for a previous iteration from the store with a signal derived from the correlated signal supplied to the detector in the current iteration.

The limiting function can for example comprise a hyperbolic tangent function. In one embodiment of the invention described below, the signal derived from the correlated signal and supplied to the further signal combiner is derived from the correlated signal via an inverse hyperbolic tangent function. In another embodiment it is derived from the correlated signal by multiplication by a multiplier which decreases as an iteration index increases; for example the multiplier can be $1/m$ or $1/(m-1)$ where a is the iteration index. Especially in this case, the signal combiner for each respective user can be arranged to subtract from the received signal not only the regenerated signals of other users but also the regenerated signal of the respective user to produce the modified received signal for the respective user.

Another aspect of the invention provides a detector for a multi-user detection arrangement in a CDMA communications system, comprising: a function responsive to a correlated received signal to produce a derived signal; a signal combiner for adding the derived signal and a stored signal from a previous detection iteration to produce a combined signal; a limiting function responsive to the combined signal to produce a detection signal having any of at least three values for supply to a signal regenerator of the multi-user detection arrangement; and a store for storing the combined signal or the detection signal for use as the stored signal for a next detection iteration.

The invention also provides a method of multi-user detection in a CDMA communications system in which signals for a plurality of users are detected from a received signal and, in successive subsequent detection iterations, for each user a regenerated signal is produced from the detected signal and a modified received signal is produced by subtracting the regenerated signals of other users from the received signal, wherein for each user the detection comprises storing a representation of a detected signal from a previous iteration, combining the stored representation with a signal derived from a correlation result from the modified received signal for a current iteration to produce a combined signal, and limiting the combined signal to produce the detected signal with any of at least three possible values.

BRIEF DESCRIPTION OF THE DRAWINGS

The invention will be further understood from the following description with reference to the accompanying drawings, in which.

DETAILED DESCRIPTION

As is known, a proposed wide-band DS-CDMA wireless cellular communications system can provide a pilot channel P and fundamental, supplemental, and control data channels F, S, and C respectively for each of a plurality (possibly a large number) of users. In a user's transmitter the signal bits of the channels are spread by orthogonal Walsh sequences and are combined with respective gains to provide a desired balance of channel signal powers. The combined signals for each user are spread using PN (pseudo random number, or pseudo noise) sequences which comprise short PN codes for in-phase and quadrature signal components together with a long PN code. The resulting complex spread signals are subjected to pulse shaping and up-conversion for transmission by the user's transmitter.

A receiver in a base station of such a system receives a signal mixture comprising the transmitted signals of multiple users and noise. This signal mixture is down-converted, separated into its I and Q (in-phase and quadrature phase) components, pulse shaped, and sampled at the PN chip rate to produce received signal samples yIn and yQn. For each user, these received signal samples are subjected to PN code despreading in a so-called rake receiver, which comprises a plurality of so-called fingers which are similar to one another except for providing different delays for the received signal samples, thereby providing matched filtering. The outputs of the fingers are combined and, in a single user detection arrangement, are despread by the respective Walsh sequences in a correlator and detected to produce received signals for the channels P, F, S, and C of the user.

Figure 1:
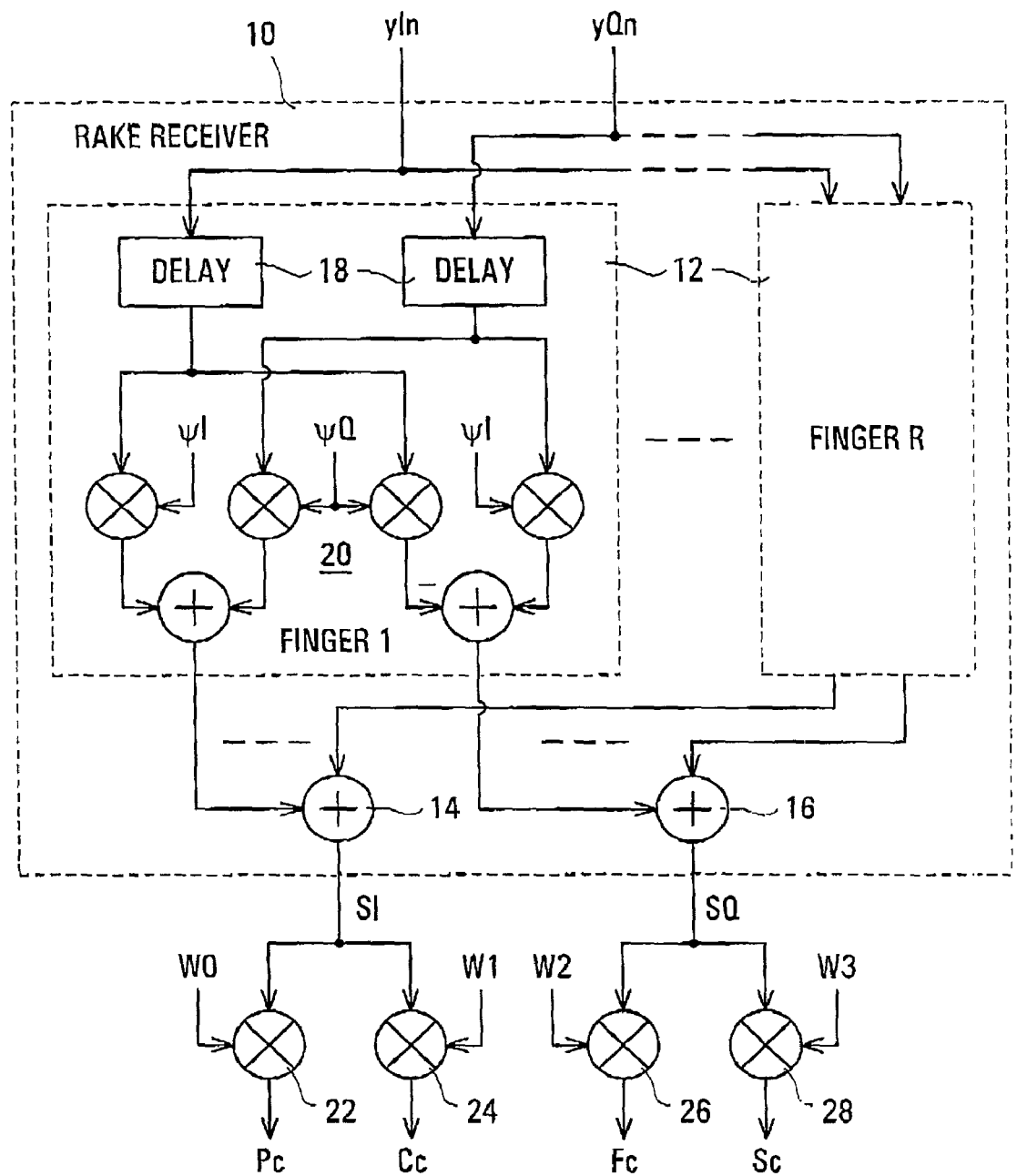
FIG. 1 illustrates a known rake receiver and Walsh sequence correlator for a single user detection arrangement in CDMA communications system.

FIG. 1 illustrates such a rake receiver and Walsh sequence correlator for a single user detection arrangement. Referring to FIG. 1, the rake receiver 10, shown within a dashed line box, comprises a plurality R (for example R=4) of fingers 12, also shown within dashed line boxes, of which only a first finger is shown in detail. The receiver 10 also comprises two complex signal adders or combiners 14 and 16 for I and Q signal components respectively. As illustrated in FIG. 1, the received signal samples yIn and yQn are supplied to respective inputs of each finger 12, and two outputs of each finger 12 are supplied to respective inputs of the adders 14 and 16, the outputs of which constitute quadrature outputs SI and SQ of the rake receiver 10, at the Walsh chip rate.

Within each finger 12, the received signal samples yIn and yQn are each delayed in a respective delay unit 18, the delays of different fingers differing from one another by successive signal bit periods. The delayed received signal samples are subjected to PN code despreading by an arrangement 20 of complex signal multipliers and adders in accordance with PN codes ψi and ψQ, in a manner which is known in the art, corresponds to that used in the transmitter, and also is further described below in the context of a similar arrangement provided in the signal regenerator of FIG. 4.

Also in a manner corresponding to that used in the transmitter and also described below with reference to the signal regenerator of FIG. 4, the output SI of the rake receiver 10 is supplied to multipliers 22 and 24 to which Walsh sequences W0 and W1 respectively are supplied, to produce correlated signals Pc and Cc respectively for the respective user's pilot and control data channels. Similarly, the output SQ of the rake receiver 10 is supplied to multipliers 26 and 28 to which Walsh sequences W2 and W3 respectively are supplied, to produce correlated signals Fc and Sc respectively of the respective user's fundamental and supplemental data channels. As described further below in the context of the signal detector of FIG. 3, the correlated signals Pc, Cc, Fc, and Sc can be integrated over each Walsh chip period and compared with a threshold to detect each bit Pi, Ci, Fi, and Si of the channels P, C, F, and S respectively. By way of example, the Walsh sequences W0 to W3 may comprise the 4-chip orthogonal sequences [1 1 1 1], [1 -1 1 -1], [1 1-1-1], and [1 -1-1 1].

A single user detection arrangement as described above in relation to FIG. 1 treats the signals of other users as noise or interference. To enhance signal detection, and thereby facilitate an increase in system capacity, or number of simultaneous users whose signals can be detected, a multi-user detection arrangement has been proposed which can for example have a form as illustrated in FIG. 2.

Figure 2:
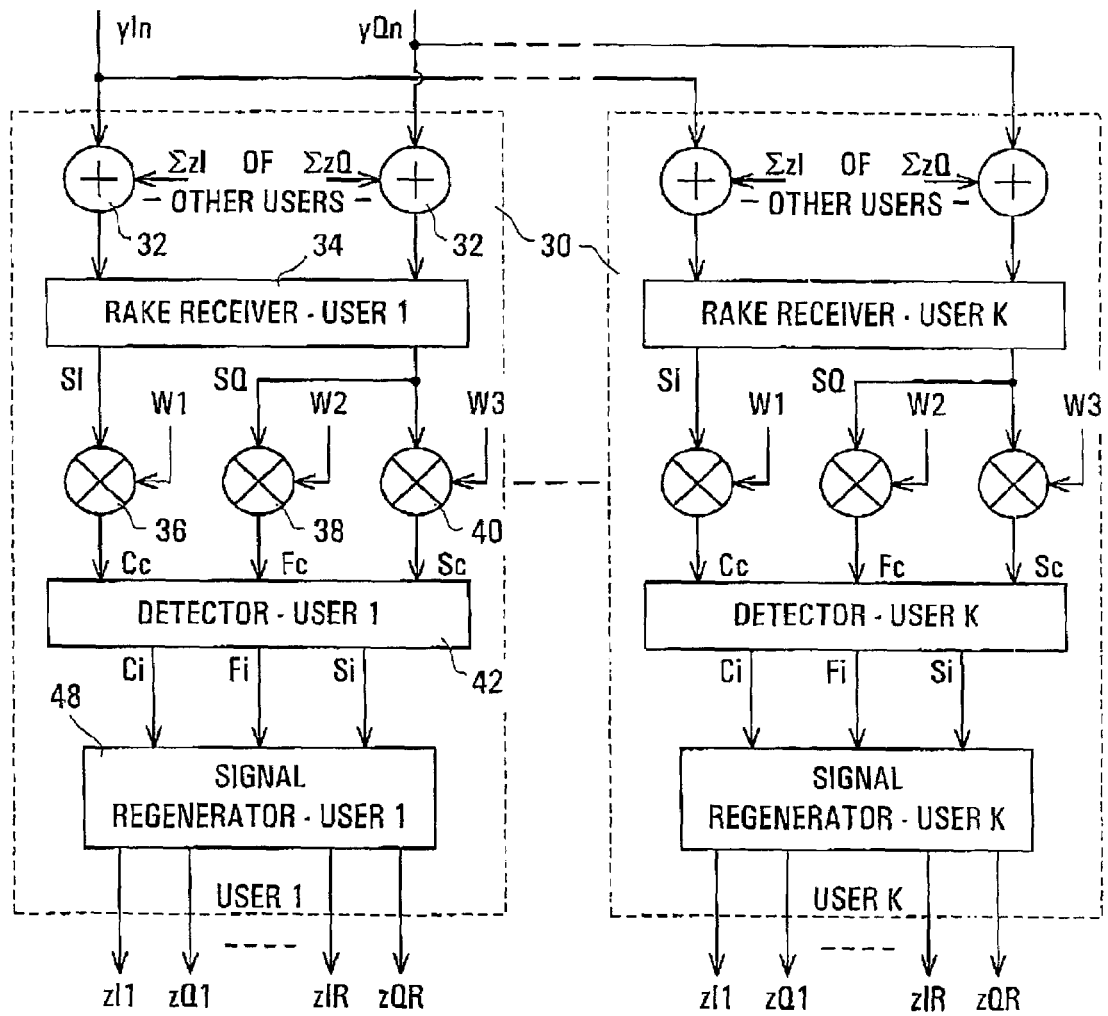
FIG. 2 illustrates a known multi-user detection arrangement.

Referring to FIG. 2, a multi-user detection arrangement is represented by dashed line detector blocks 30 each of which relates to a respective one of a plurality (possibly a large number) of K users 1 to K. As the detector blocks are similar to one another, only the block 30 for the user 1 is described in detail below, and corresponding comments apply to each other detector block. Each detector block is arranged to operate in an iterative manner, as further described below.

The received signal samples yIn and yQn provided as described above are supplied to inputs of each detector block 30. As shown for the user 1, these received signal samples are supplied via respective complex signal combiners or adders 32, described further below, to inputs of a rake receiver 34. For a first iteration or pass of a signal via the detector block 30, other inputs of the signal combiners 32 are set to zero, so that the received signal samples yIn and yQn are effectively supplied directly to the inputs of the rake receiver 34. The rake receiver 34 can be substantially the same as the rake receiver 10 illustrated in FIG. 1 and described above. In the same manner as described above, the rake receiver 34 produces output signals SI and SQ for the user 1.

The signal SI is supplied to one input, and the Walsh sequence W1 is supplied to another input, of a multiplier 36 which produces a correlated signal Cc at the Walsh chip rate for the control data channel C for the user 1. Similarly, the signal SQ is supplied to one input, and the Walsh sequences W2 and W3 are supplied to another input, of multipliers 38 and 40 respectively which produce correlated signals Fc and Sc respectively at the Walsh chip rate for the fundamental data channel F and the supplemental data channel S respectively, for the user 1. Thus it can be appreciated that the rake receiver 34 and multipliers 36, 38, and 40 in FIG. 2 for the user 1 correspond to the rake receiver 10 and the multipliers 24, 26, and 28 of the single user detector of FIG. 1. As the pilot channel P for each user comprises all 1 bits, it need not be treated in the same manner as the data channels and it is not generally discussed further below.

Figure 3:
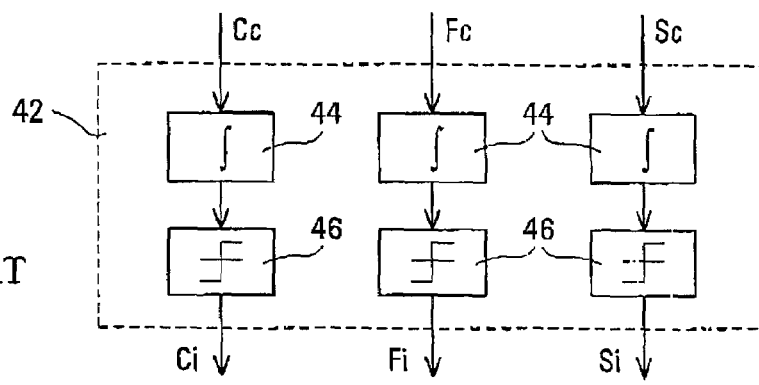
FIG. 3 illustrates a known binary decision detector for the arrangements of FIGS. 1 and 2.

The output signals of the multipliers 36, 38, and 40 are supplied to inputs of a detector 42. In the prior art, the detector 42 integrates these signals each over the Walsh sequence and compares the integrated results with thresholds to produce detected information bits Fi, Si, and Ci for the respective data channels for the respective user. FIG. 3 illustrates such a detector.

Referring to FIG. 3, the known detector 42 comprises an integrator 44 and a threshold circuit 46 for each of the data channel signals. For example, for the signal of the fundamental data channel F, an integrator 44 is supplied with the correlated signal samples Fc and integrates these over the duration of a Walsh sequence to produce an integrated signal. The subsequent threshold circuit 46 compares the integrated signal with a threshold of zero, i.e. determines the sign of the integrated signal (each Walsh sequence being a sequence of 1 and −1 values), to determine the resulting detected binary value of the respective information bit Fi of the fundamental data channel. Information bits Ci and Si of the control and supplemental data channels are detected similarly.

Referring again to FIG. 2, the detected information bits Ci, Fi, and Si produced by the detector 42 constitute the tentative decision bits, referred to above, for the respective user. These detected information bits are supplied to a signal regenerator 48 which produces, in accordance with the signal amplitudes and delays associated with each of the fingers of the rake receiver 34 for this user, replicated or regenerated quadrature signals zI and zQ for each finger 1 to R. In FIG. 2 these regenerated signals are referenced zI1 to zIR and zQ1 to zQR for each of the users 1 to K.

Figure 4:
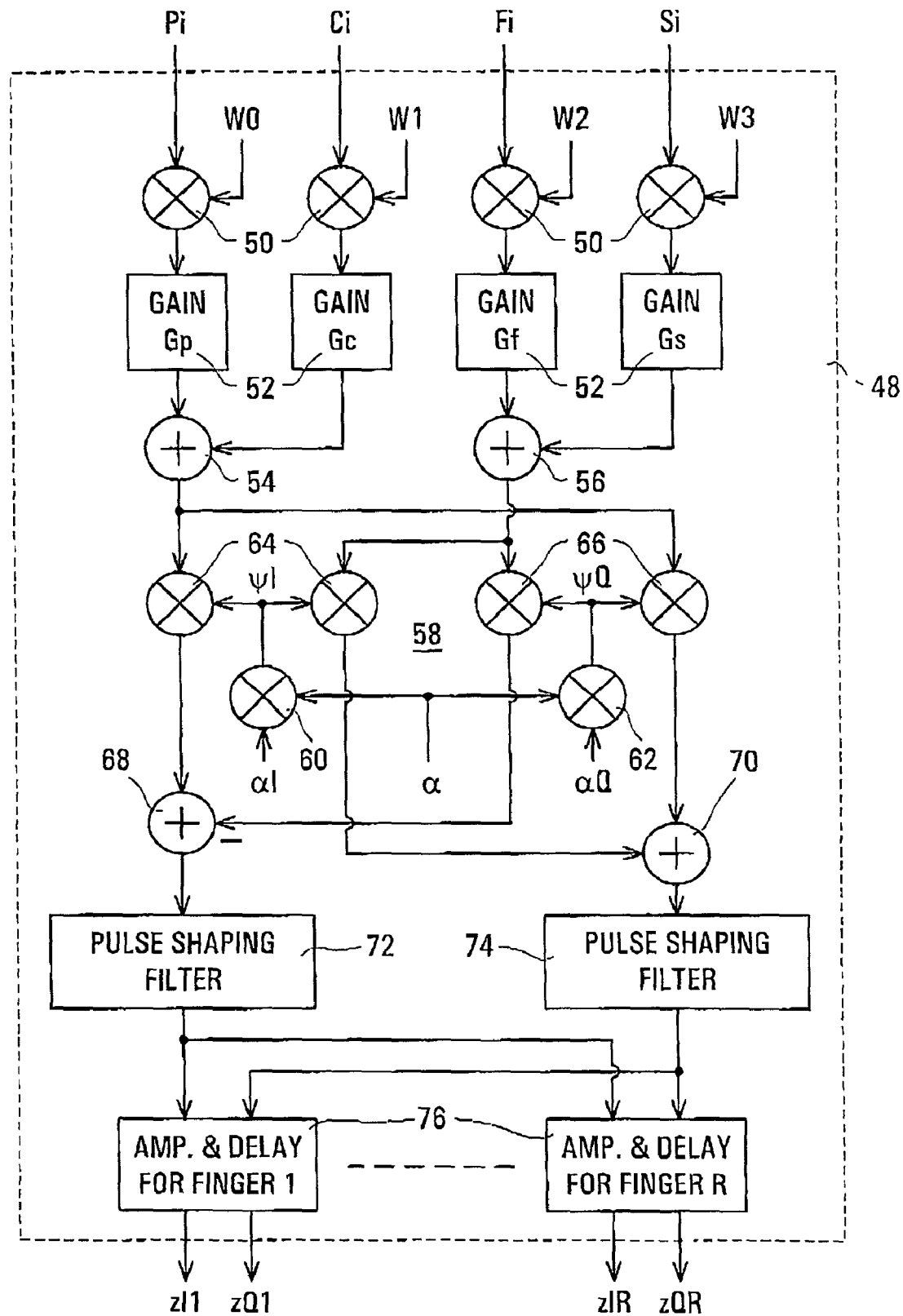
FIG. 4 illustrates a known signal regenerator for use in the multi-user detection arrangement of FIG. 2.

FIG. 4 illustrates one form of signal regenerator 48 for producing the regenerated signals zI and zQ from detected information signal bits Pi, Ci, Fi, and Si of respectively the pilot channel P and the data channels C, F, and S for a respective user's signal. The form of the signal regenerator 48 is largely similar to that of a transmitter for the corresponding signals, because it serves to replicate transmitted signals from the signal information bits as currently detected in the iterative detection process.

Referring to FIG. 4, the all-ones pilot channel bits Pi and the information signal bits Ci, Fi, and Si as currently detected are supplied to one input, and the respective Walsh sequences W0, W1, W2, and W3 are supplied to another input, of respective multipliers 50 for Walsh code spreading, and the resulting spread signals are provided with relative gains Gp, Gc, Gf, and Gs respectively by respective gain units 52. The spread and gain adjusted signals for the pilot and control data channels are combined in a complex signal combiner or adder 54, and the spread and gain adjusted signals for the fundamental and supplemental data channels are combined in a complex signal combiner or adder 56.

The combined signals from the outputs of the adders 54 and 56 are supplied to a complex spreader 58, comprising complex signal multipliers and adders, which spreads the signals in accordance with quadrature spreading sequences αI and αQ and a long PN code α. More specifically, multipliers 60 and 62 serve respectively to produce PN codes ψI and ψQ, also referred to above in relation to the rake receiver of FIG. 1, from the quadrature spreading sequences αI and αQ and the long PN code α. The outputs of the adders 54 and 56 are spread by the PN code ψI in two multipliers 64, whose outputs are supplied to one input of signal adders 68 and 70 respectively. The outputs of the adders 54 and 56 are also spread by the PN code ψQ in two multipliers 66, whose outputs are supplied to another input of the signal adder 70 and to a subtractive input of the signal adder 68, respectively. The quadrature outputs of the signal adders 68 and 70 are filtered by pulse shaping filters 72 and 74 respectively. The outputs of the pulse shaping filters 72 and 74 are supplied to inputs of each of R amplitude and delay units 76, each associated with a respective one of the R fingers of the rake receiver and providing a corresponding multipath channel delayed and amplitude adjusted signal at its output. The outputs of the units 76 constitute the regenerated signals zI1 to zIR and zQ1 to zQR.

As indicated above, multi-user detection follows an iterative process for detecting each signal information bit in which, in a second and any subsequent iteration, in the block 30 for each user the complex signal combiners or adders 32 serve to subtract from the received signal samples yIn and yQn the sums ΣzI and ΣzQ respectively of the regenerated signals zI1 to zIR and zQ1 to zQR respectively of all of the other users. Thus, referring again to FIG. 2, in a second iteration for example for the user 1 one signal combiner 32 subtracts from the received signal sample yIn the sum ΣzI of the regenerated signals zI1 to zIR of the other users 2 through K produced in the first iteration as described above, and the other signal combiner 32 subtracts from the received signal sample yQn the sum ΣzQ of the regenerated signals zQ1 to zQR of the other users 2 through K produced in the first iteration as described above. Similarly, for the user K one signal combiner 32 subtracts from the received signal sample yIn the sum ΣzI of the regenerated signals zI1 to zIR of the other users 1 through K-1 produced in the first iteration as described above, and the other signal combiner 32 subtracts from the received signal sample yQn the sum ΣzQ of the regenerated signals zQ1 to zQR of the other users 1 through K-1 produced in the first iteration as described above.

Thus the rake receiver 34 for each respective user is supplied on the second iteration with received signal samples which are enhanced for the respective user by having the regenerated signals of all of the other users subtracted therefrom, thereby ideally enabling an improved detection of the user's signals, in the manner described above, on this second iteration. This process can be repeated for further iterations, ideally with further improvement in the detection of the signals. Conversely, the iterations ideally enable reliable detection of signals for an increased number K of users, thereby increasing the capacity of the CDMA system.

However, these ideals are not realized in practice, because as the number K of users is increased, the reliability of the tentative decision bits detected in the first iteration decreases, and errors in these tentative decision bits result in consequent errors in the signal regeneration, and hence errors in the detection of information bits in subsequent iterations of the detection process. Consequently, there is a propagation of errors through the iterative multi-user detection process. In addition, accurate estimation of the multipath channel fading gains and multipath delays is desirable for accurate signal regeneration, and sufficient accuracy is not practically achievable. Thus the goal of the multi-user detection process, to achieve a significant increase in system capacity by using an iterative process, is not met because the number of iterations is very limited, for example to only two, by error propagation.

In an embodiment of the invention described below, the problem of error propagation is avoided or substantially reduced by providing a different type of detector 42. More specifically, instead of using a detector 42 as described above with reference to FIG. 3 in which a threshold unit 46 provides a hard binary decision for each detected bit by a comparison process, the detector provides a soft decision or limiting function for each bit, and a recursive filtering process, with first order memory between soft decisions or limited values in successive iterations, is used to provide successively increased accuracy and reliability of the soft decisions or limited values and resulting bit decisions. Consequently, the number m of iterations can be larger than the typical 2 iteration limit of the prior art, resulting in the goal of a large increase in system capacity becoming achievable by virtue of the multi-user detection process. In embodiments of the invention described below, typically 4 or 5 iterations may provide an optimum result, with relatively little improvement for further iterations beyond this.

In physical terms, the soft decision or limiting function serves to weight the regenerated signals, which are subtracted by the signal adders 32, in accordance with the reliability of the decisions on which these regenerated signals are based, so that an unreliable decision results in subtraction of a relatively low-weighted regenerated signal, and a relatively reliable decision results in subtraction of a relatively high-weighted regenerated signal. As described below, this is achieved using limiting circuits in the detector, not merely the binary decision threshold unit 46 as described above.

For clarity and simplicity in the description below, mathematical derivations of the respective equations are omitted; these can if desired be determined by those of ordinary skill in the art. In addition, for simplicity only the signal of the fundamental data channel F is generally discussed below, and it should be understood that corresponding equations and processes can be applied equally and in a similar manner to the signals of the other data channels.

An output $f_i^{RR}$ from the Walsh sequence correlator in a detector block 30 of FIG. 2 for a specific user, for an information bit i of the fundamental data channel F, can be expressed as:

$$f_i^{RR} = \tanh\left(\frac{A}{4\sigma_v^2} \cdot \int_1^4 RR_F\right)$$

where A is the amplitude of the rake receiver output, $\sigma_v^2$ is the noise power for each user, and the integral $\int RR_F$ is the Walsh correlator output for the fundamental data channel over the 4-chip (in this case, as described above) Walsh sequence. This is a soft output, i.e. an output whose value is anywhere in a continuous or a multiple-valued (more than two binary values) range.

Applying Bayes' estimation procedure to this correlator soft output provides the following recursive filtering algorithm:

$$f_{i,k}^{(m)} = \frac{f_{i,k}^{(m-1)} + f_{i,k}^{(m)RR}}{1 + f_{i,k}^{(m-1)} \cdot f_{i,k}^{(m)RR}}$$

where $f_{i,k}^{(m)}$ is the estimation for the bit i of the fundamental data channel for the user k at the iteration m, and m>1. It can be seen that this recursive filtering algorithm has first order memory, i.e. the estimation for the iteration m is dependent upon the estimation for the preceding iteration m−1.

The division operation in this equation for the recursive filtering algorithm can be avoided, thereby facilitating a simpler implementation, by expressing the filtering algorithm in the mathematically equivalent form:

$$f_{i,k}^{(m)} = \tanh(\text{arctanh}(f_{i,k}^{(m-1)}) + \text{arctanh}(f_{i,k}^{(m)RR})).$$

Figure 5:
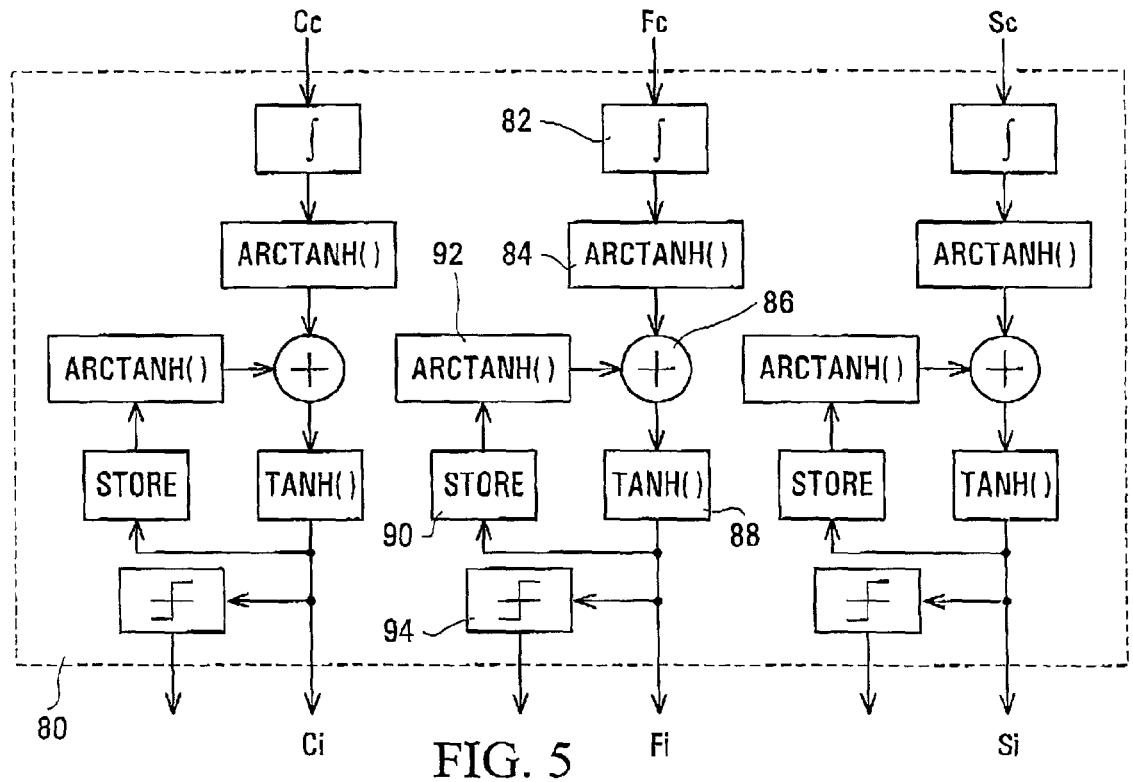
FIG. 5 illustrates a detector for the multi-user detection arrangement of FIG. 2 in accordance with an embodiment of the invention.

FIG. 5 illustrates an implementation of this algorithm in a detector 80 which replaces the detector 42 in each block 30 of the multi-user detection arrangement of FIG. 2, for the fundamental data channel F and correspondingly for the control and supplemental data channels C and S. As the detector block 80 includes the same functions for each of the data channels, only those for the fundamental data channel F are referenced in the drawing and described below.

Referring to FIG. 5, the detector 80 includes an integrator 82 which is supplied with the correlated signal samples Fc of the fundamental data channel F and integrates these over the duration of a Walsh sequence to produce an integrated signal which constitutes the correlator soft output signal $$f_{i,k}^{(m)RR}$$

for the current iteration m. This is supplied to an input of an arctanh (inverse hyperbolic tangent) function 84 whose output is supplied to one input of a signal adder 86. An output of the adder 86 is supplied to a tanh (hyperbolic tangent) function 88, whose output constitutes the soft decision output Fi of the detector 80 for the bit i of the fundamental data channel F in the current iteration m. This soft decision is stored in a one-iteration memory or store 90 to be used in the next iteration. For each iteration m after the first, the stored soft decision from the previous iteration m−1 is supplied from the store 90 to another arctanh function 92, whose output is supplied to a second input of the signal adder 86. After a desired number of iterations, a hard binary decision output of the detector 80 can be derived from the soft decision output Fi by a threshold unit 94 for example of the same form as the threshold units 46 in the detector of FIG. 3. The input to the threshold unit 94 can alternatively be taken from the output of the adder 86.

It can be seen that there is a direct correspondence between the units 84 to 92 of the detector 80 of FIG. 5 and the last preceding equation, so that these units perform the recursive filtering function of that equation.

Figure 6:
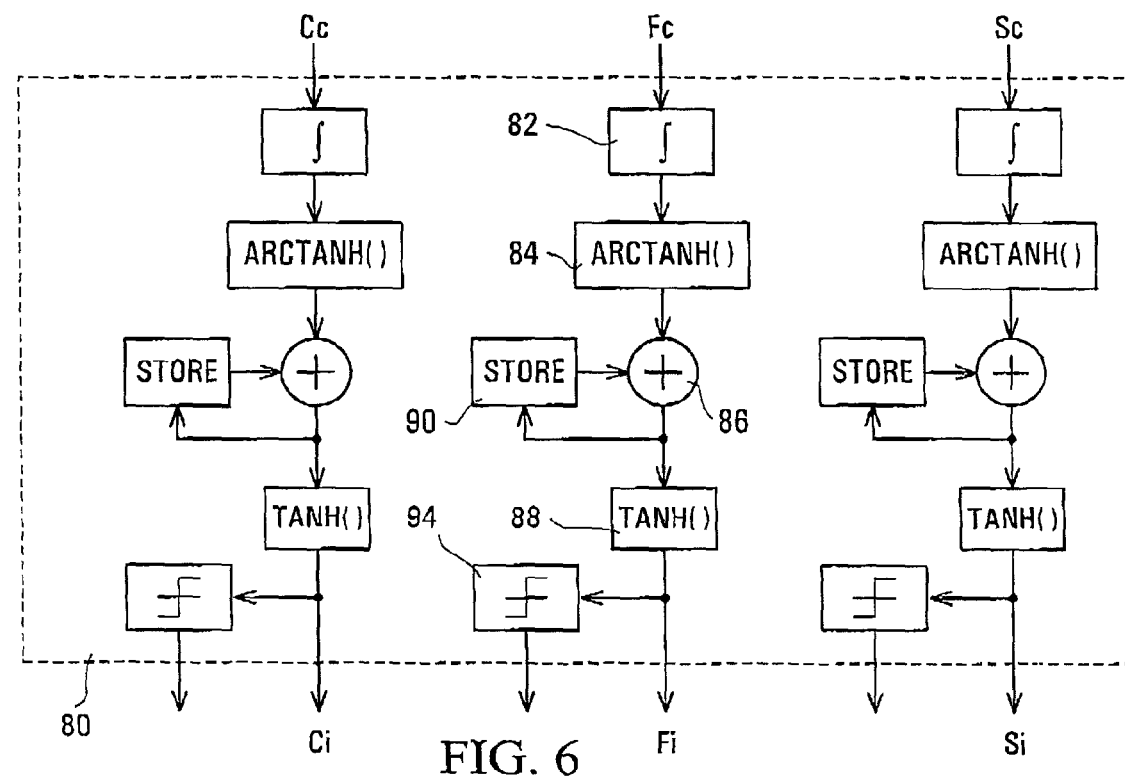
FIG. 6 illustrates a simplified form of the detector of FIG. 5.

FIG. 6 illustrates a simplified form of the detector 80 of FIG. 5, using the same references for similar elements, in which the same functions are provided by omitting the arctanh function 92, connecting the input of the store 90 to the output of the adder 86, and connecting the output of the store 90 to the second input of the adder 86. Again, the input to the threshold unit 94 can alternatively be taken from the output of the adder 86.

The soft decision algorithm as described above and implemented by the detector of FIG. 5 or FIG. 6 is based on Bayesian estimation of the channel which, while effective, is not the only approach that may be taken. An alternative and more general approach, leading to another embodiment of the invention, is described below.

Ideally (i.e. if the signal regeneration is perfectly correct), the signal regeneration process described above can be expressed in a matrix equation (i.e. a system of linear equations) in the form:

$$Y = RG(s) + v$$

where Y is an input signal, RG represents the signal regeneration function which is a linear function of the unknown information symbol vector s, and v represents noise. In general, solving such a system of linear equations enables the unknown information symbol vector s to be determined.

A direct mathematical solution method is the Richardson iterative method, in accordance with which:

$$s(m)=s(m-1)+D_m(Y-RG(s(m-1)))$$

where m is the iteration number for m>1, s(m) is an estimate of the information symbol vector at the iteration m, and $D_m$ is a gain matrix equal to $\lambda_m T$, where T is a matrix and $\lambda_m$ is a sequence.

This method does not provide a solution as to how to choose the matrix T and the sequence $\lambda_m$. One possible approach is the Kalman filtering technique, but this involves matrix inversion and multiplication at each iteration, and hence a relatively large number of computing operations. In preference to this, the embodiment of the invention described below uses the simpler gain matrix:

$$D_m = \frac{1}{m-1} \cdot RR$$

where again m is the iteration number or index (for m>1) and RR is the output of the rake receiver before or after the Walsh sequence correlator. It can be seen from this that with successive iterations, i.e. with increasing values of m, the magnitude of the gain matrix $D_m$ is reduced due to its inverse dependency on m, so that changes from s(m−1) to s(m), i.e. the step size between successive values of $\lambda_m$ on successive iterations, decreases with increasing m, i.e. as the successive iterations produce an increasingly more accurate result for s(m).

Substituting for $D_m$ in the above equation gives:

$$s(m) = s(m-1) + \frac{1}{m-1} \cdot RR(Y - RG(s(m-1))),$$

from which a final iterative multi-user detection algorithm can be expressed as:

$$s(m) = s(m-1) + \frac{1}{m-1} \cdot [Z - RR[RG(s^{soft}(m-1))]]$$

where Z=RR(Y) is the output of the rake receiver before or after the Walsh sequence correlator (or matched filter) with a received signal Y, $s^{soft}(m-1)$ is a soft output of the detector which constitutes the input to the signal regenerator, s(1) is an initial information symbol vector of all zeros, and m is the iteration index with m>1.

The soft output of the detector corresponds to a soft limiting of the iterative decision s(m). This is conveniently provided in accordance with a hyperbolic tangent function, with $s^{soft}(m-1)=\tanh(s(m-1))$. Alternatively, other limiting functions can be used, as described further below with reference to FIG. 9.

In the above equations, the parameter Y−RG(s(m−1)) is effectively an error signal constituted by the difference between the input signal Y and the combined regenerated signals, at the iteration m−1, for all of the users. The algorithm operates by determining this error signal and applying it to the input of the rake receiver, thereby generating a correction RR(Y−RG(s(m−1))) which for the current iteration m is weighted by the multiplier 1/(m−1) and added to the previous determination s(m−1) to produce a new and more accurate determination s(m).

Figure 7:
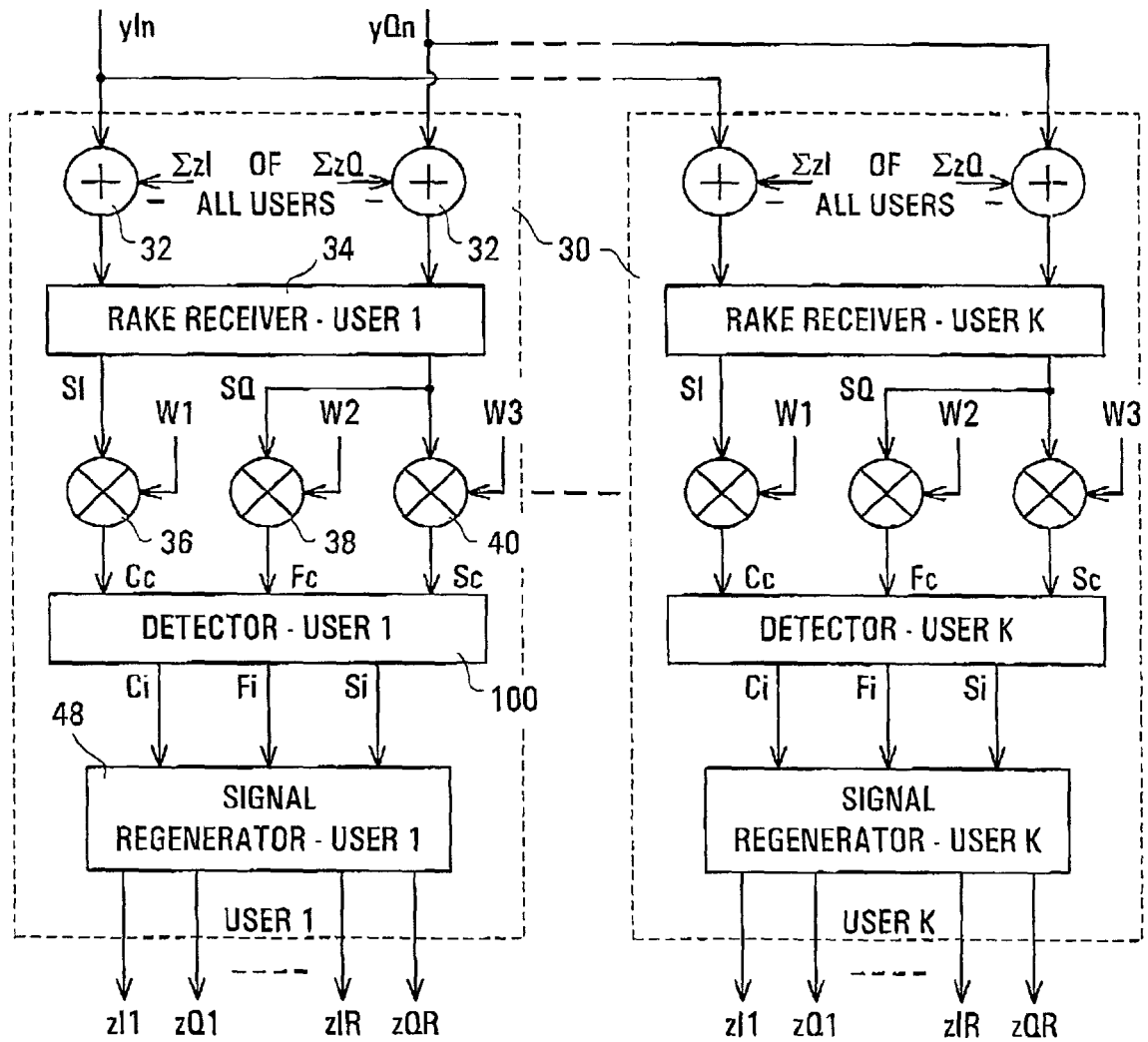
FIG. 7 illustrates a multi-user detection arrangement in accordance with another embodiment of the invention.

Consequently, the multi-user detection arrangement of FIG. 2 as described above is modified to a form as shown in FIG. 7, in which the signal combiners 32 at the inputs of the rake receiver 34 for each user subtract from the quadrature input signal components not only the sum of the regenerated quadrature signal components of the respective other users as described above, but also the regenerated quadrature signal components of the respective user as so far determined in the iterative process. In other words, as illustrated in FIG. 7 the signal combiners 32 in this case subtract the summed signal components of all users from the input signal components. Otherwise (except for the form of each detector 100 as described below, replacing the detectors 42 in FIG. 2), the arrangement of FIG. 7 is similar to that of FIG. 2. It can be appreciated that the modification of the operation of the signal combiners 32 enables these to be provided commonly for the detectors 30 of all of the users.

Figure 8:
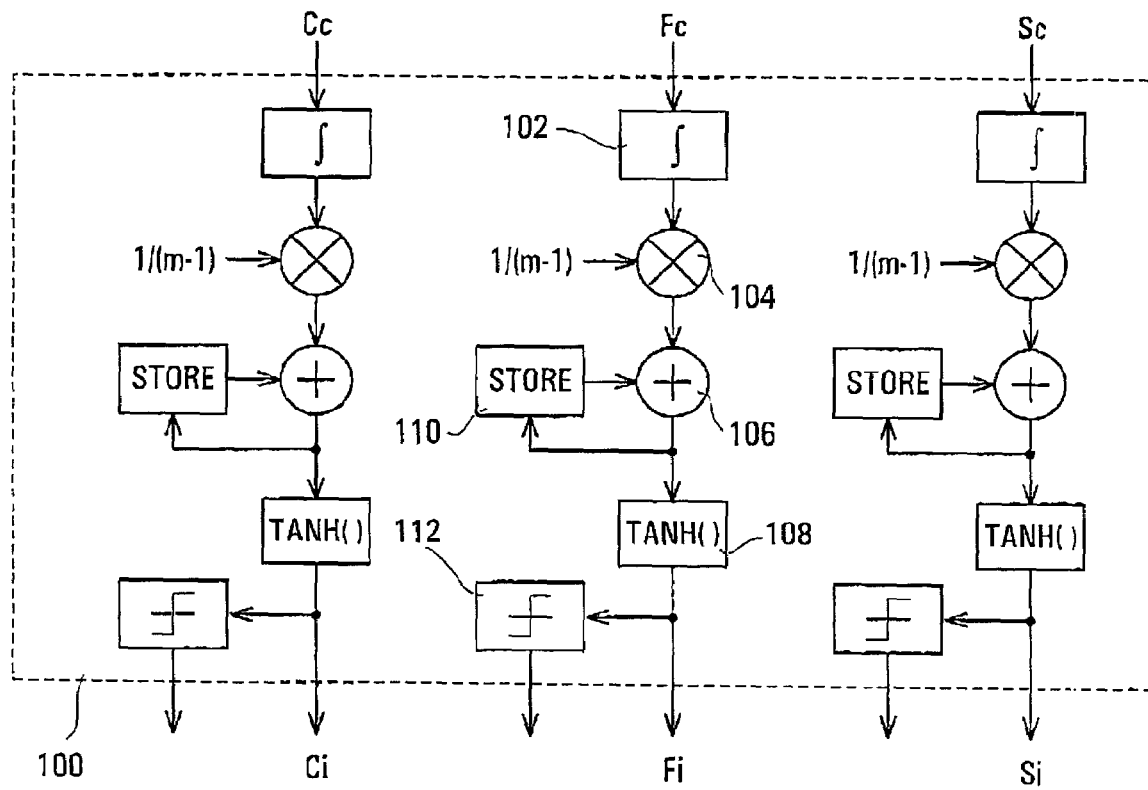
FIG. 8 illustrates a detector for the multi-user detection arrangement of FIG. 7.

FIG. 8 illustrates a detector 100 which can be used in the arrangement of FIG. 7 to implement the algorithm described above using a hyperbolic tangent soft limiting function, for the fundamental data channel F and correspondingly for the control and supplemental data channels C and S. As the detector block 100 includes the same functions for each of the data channels, only those for the fundamental channel F are described below.

Referring to FIG. 8, the detector 100 includes an integrator 102 which is supplied with the signal samples Fc of the fundamental data channel F and integrates these over the duration of a Walsh sequence to produce an integrated signal, which constitutes the Walsh sequence correlator output signal Z−RR[RG($s^{soft}$(m−1))] for the current iteration m. This is supplied to an input of a multiplier 104, another input of which is supplied with the weighting factor or multiplier 1/(m−1). An output of the multiplier 104 is supplied to one input of a signal adder 106, a second input of which is constituted by the output of a one-iteration memory or store 110, which stores the output of the adder 106 for the previous iteration m−1 (for the first iteration with m=1, the second input of the adder 106 is set to zero). An output of the adder 106 constitutes the signal s(m) for the current iteration m as discussed above, and is supplied to a tanh (hyperbolic tangent) function 108 which implements the soft limiting also discussed above. An output of the tanh function 108 constitutes a soft decision output Fi of the detector 100 for the bit i of the fundamental data channel F in the current iteration m, and is supplied to the signal regenerator 48 for the respective user as described above.

After a desired number of iterations, a hard binary decision output of the detector 100 can be derived from the soft decision output Fi by a threshold unit 112 for example of the same form as the threshold units 46 in the detector of FIG. 3. The input to the threshold unit 112 can alternatively be taken from the output of the adder 106.

It can be seen that there is a direct correspondence between the units 104 to 110 of the detector 100 of FIG. 8 and the multi-user detection algorithm equation expressed above, so that these units perform the recursive filtering function of that equation.

For consistency and direct comparison with the earlier description and drawings, the above algorithm is described with reference to FIGS. 7 and 8 as being applied to the output of the rake receiver after the Walsh sequence correlation. However, the algorithm can alternatively be applied directly to the output of the rake receiver before the Walsh correlation, and hence commonly for all of the data channels of the respective user. In this case the Walsh sequence correlation multipliers 36, 38, and 40 shown in FIG. 7, the integrators 102 in the detector 100 of FIG. 8, and the Walsh sequence multipliers 50, gain units 52, and signal combiners 54 and 56 in the signal regenerator 48 of FIG. 4, would be omitted from the iterative processing arrangement, which accordingly is applied to the Walsh chips for each user, the Walsh correlation only being applied after the iterative process to determine the respective data channel information bits from the Walsh chips.

Figure 9:
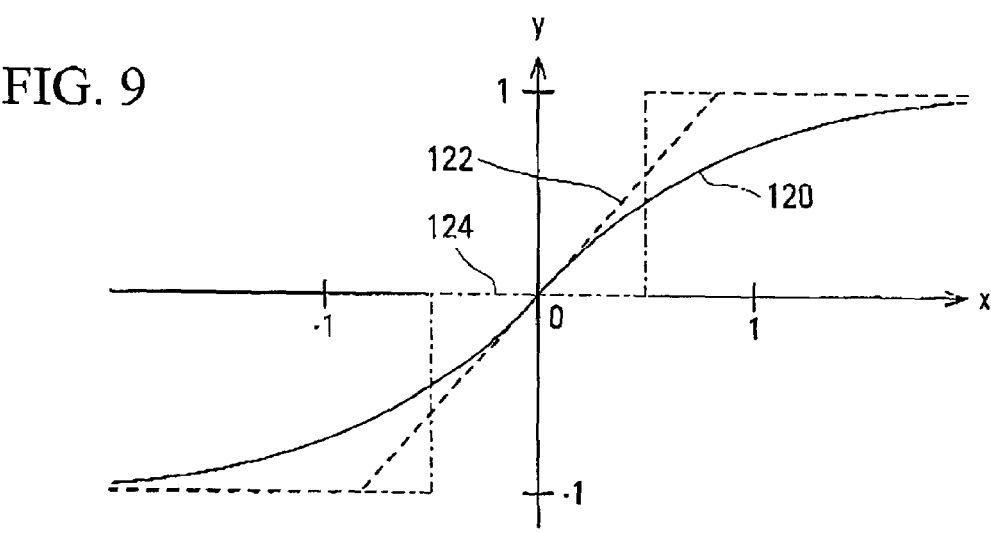
FIG. 9 is a graph illustrating examples of limiting functions used in the detectors of FIGS. 5, 6, and 8.

For providing a further understanding, FIG. 9 illustrates by a curve 120 the hyperbolic tangent function y=tanh(x) used for soft limiting in the unit 108 as described above. In accordance with this function, the output y of the function has a soft value, i.e. a value which can be anywhere within a substantially continuous range of values, which has the same sign as the input x to the function, but has a magnitude which is progressively more limited as the magnitude of x increases. This is in contrast to the hard binary decision function provided by units such as the threshold circuits 46, which provide discrete binary outputs (i.e. an output of +1 for a positive input of any magnitude, and an output of −1 for a negative input of any magnitude), as represented by the symbols used in FIG. 3 for these circuits 46.

Although the hyperbolic tangent function provides a convenient soft limiting function in the detector 100 as described above, it should be understood that this is not the only function that can be used and that other limiting functions using non-linear or linear relationships could be provided instead. For example, FIG. 9 also shows by dashed lines 122 an alternative relationship which could be provided in place of the tanh function 108 in the detector 100, in which the output y is linearly dependent upon the input x up to a certain (positive or negative) magnitude of the input x for which the magnitude of the output y is 1, the output magnitude being constant (i.e. limited) for larger magnitude inputs.

Further, FIG. 9 also shows by chained lines 124 another alternative relationship which could be provided in place of the tanh function 108 in the detector 100. In this case the output y has any one of three possible values, being limited to +1 for values of the input x greater than a predetermined positive value (0.5 as illustrated), being limited to −1 for values of the input x more negative than a predetermined negative value (−0.5 as illustrated), and being zero for values of the input x between the predetermined positive and negative values. It can be appreciated that with this relationship shown by the lines 124, the output Fi to the signal regenerator has a zero weighting except when the magnitude of the input x, i.e. the output of the adder 106, exceeds the predetermined value.

It can be appreciated from the lines 120, 122, and 124 in FIG. 9 that the limiting function provided as described above can provide an output of the detector with three or more values to constitute the input to the signal regenerator 48, as distinct from only the two binary values provided by each threshold circuit 46 of the prior art detector 42.

It should also be appreciated that the multiplier 1/(m−1) as described above is selected as a convenient way of providing the sequence of numbers $\lambda_m$ so that the value of $\lambda_m$ decreases with increasing m, as is desired for the successive iterations of the multi-user detection process to produce increasingly accurate results. This sequence may alternatively have some other inverse dependence upon m, for example the multiplier may be 1/m instead of 1/(m−1), or it may be some other sequence not necessarily dependent upon m, for example arrived at by Kalman filtering techniques as mentioned above.

Although in the embodiments of the invention described above the recursive filtering algorithms are applied for detection of information bits of all of the data channels, this need not necessarily be the case. More generally, the recursive filtering algorithms may be applied for detection of the signals of one or more of the data channels of one or more of the users, the signals of other data channels being treated as noise for the recursive filtering algorithm and being detected in known manner. Further, it can be appreciated that for any user one or more of the data channels may not be provided or may have no signal present at any particular time.

It can be appreciated that although as described above the functions of the detectors 80 and 100 and other units are described as discrete blocks, they can in practice be implemented in any desired form using any known devices and techniques, including analog elements and digital signal processing techniques implemented in a discrete manner or in integrated circuits.

Furthermore, although as described above a single detector block 30 is provided for each user and is operated in an iterative manner in time, alternatively the iteration could be provided in space by a plurality of successive such blocks 30 for each user (the first such block omitting the signal combiners 32, and the last such block omitting the signal regenerator 48, and providing a hard binary detector decision as described above), with the store 90 or 110 being provided in a path from the output of a signal combiner 86 (or tanh function 88) or 106 for one iteration of the block 30 to the input of the signal combiner 86 (or arctanh function 92) or 106 in the next iteration of the block 30. Conversely, detector blocks 30 for different ones of the K users may be multiplexed in time. Generally, any practical and desired arrangement of one or more such detector blocks 30 may be provided, individually and/or multiplexed in space and/or time.

Thus although particular embodiments of the invention are described above, it can be appreciated that the invention is not limited to these and that numerous modifications, variations, and adaptations may be made within the scope of the invention as defined in the claims.

What is claimed is:

1. An iterative arrangement for receiving and detecting signals of a plurality of users in a CDMA communications system, comprising, for signals of each user:

a signal combiner for subtracting regenerated signals of other users from a received signal to produce a modified received signal for the user;

a receiver arrangement responsive to the modified received signal for producing a correlated signal for the user;

a detector responsive to the correlated signal for producing a detected signal; and a signal regenerator responsive to the detected signal for producing a regenerated signal for the user for subtraction from the received signal in the signal combiners of other users;

wherein the detector comprises a store, a limiting function, and a further signal combiner, the limiting function being responsive to an output of the further signal combiner to produce a limited signal having any of at least three possible values as the detected signal for the signal regenerator, the store being responsive to the output of the further signal combiner to store a representation of the detected signal in a current iteration, and the further signal combiner being arranged to combine a representation of the detected signal for a previous iteration from the store with a signal derived from the correlated signal supplied to the detector in the current iteration.

2. An arrangement as claimed in claim 1 wherein the limiting function comprises a hyperbolic tangent function.

3. An arrangement as claimed in claim 1 wherein the signal derived from the correlated signal and supplied to the further signal combiner is derived from the correlated signal via an inverse hyperbolic tangent function.

4. An arrangement as claimed in claim 1 wherein the signal derived from the correlated signal and supplied to the further signal combiner is derived from the correlated signal by multiplication by a multiplier which decreases as an iteration index (m) increases.

5. An arrangement as claimed in claim 1 wherein the signal derived from the correlated signal and supplied to the further signal combiner is derived by multiplying the correlated signal by 1/in or 1/(m-1) where m is an iteration index.

6. An arrangement as claimed in claim 1 wherein the signal combiner for each respective user is arranged to subtract from the received signal not only the regenerated signals of other users but also the regenerated signal of the respective user to produce the modified received signal for the respective user.

7. A detector for a multi-user detection arrangement in a CDMA communications system, comprising:
   a function responsive to a correlated received signal to produce a derived signal;
   a signal combiner for adding the derived signal and a stored signal from a previous detection iteration to produce a combined signal;
   a limiting function responsive to the combined signal to produce a detection signal having any of at least three values for supply to a signal regenerator of the multi-user detection arrangement; and
   a store for storing the combined signal or the detection signal for use as the stored signal for a next detection iteration.

8. A detector as claimed in claim 7 wherein the function responsive to the correlated received signal to produce the derived signal comprises an inverse hyperbolic tangent function.

9. A detector as claimed in claim 7 wherein the function responsive to the correlated received signal to produce the derived signal comprises a multiplier for multiplying the correlated received signal by a multiplier which decreases as an iteration index (m) increases.

10. A detector as claimed in claim 7 wherein the function responsive to the correlated received signal to produce the derived signal comprises a multiplier for multiplying the correlated received signal by 1/in or 1/(m-1) where in is an iteration index.

11. A detector as claimed in claim 7 wherein the limiting function comprises a hyperbolic tangent function.

12. A detector as claimed in claim 7 and including an integrator for producing the correlated received signal by integration of a received signal over a code chip of the system.

13. A detector as claimed in claim 8 and including an integrator for producing the correlated received signal by integration of a received signal over a code chip of the system.

14. A detector as claimed in claim 9 and including an integrator for producing the correlated received signal by integration of a received signal over a code chip of the system.

15. A detector as claimed in claim 10 and including an integrator for producing the correlated received signal by integration of a received signal over a code chip of the system.

16. A detector as claimed in claim 11 and including an integrator for producing the correlated received signal by integration of a received signal over a code chip of the system.

* * * * *